Sept. 8, 1964
H. A. STIFFLER
3,147,958
ICE CREAM-MILK MIXER
Filed Feb. 13, 1963
3 Sheets-Sheet 1
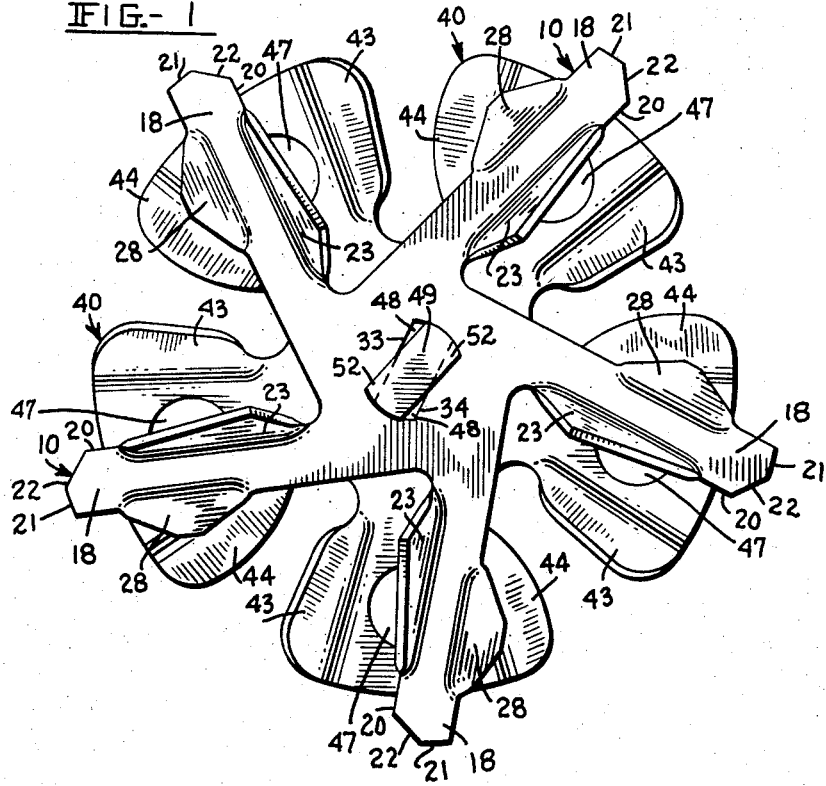
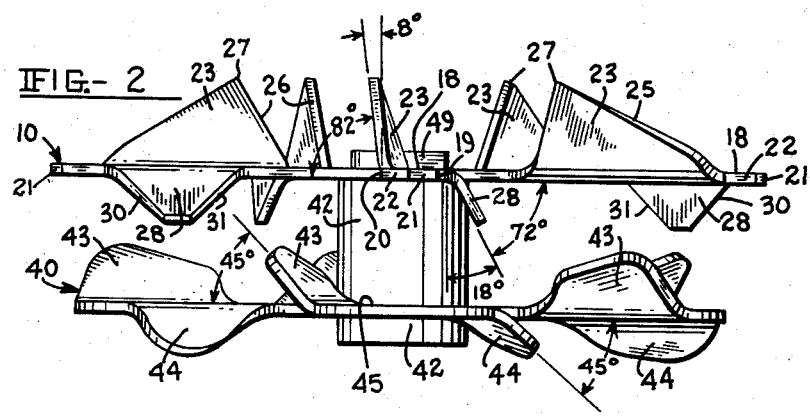
INVENTOR
HUGH A. STIFFLER
BY Herbert Q. Weinturn
ATTORNEY

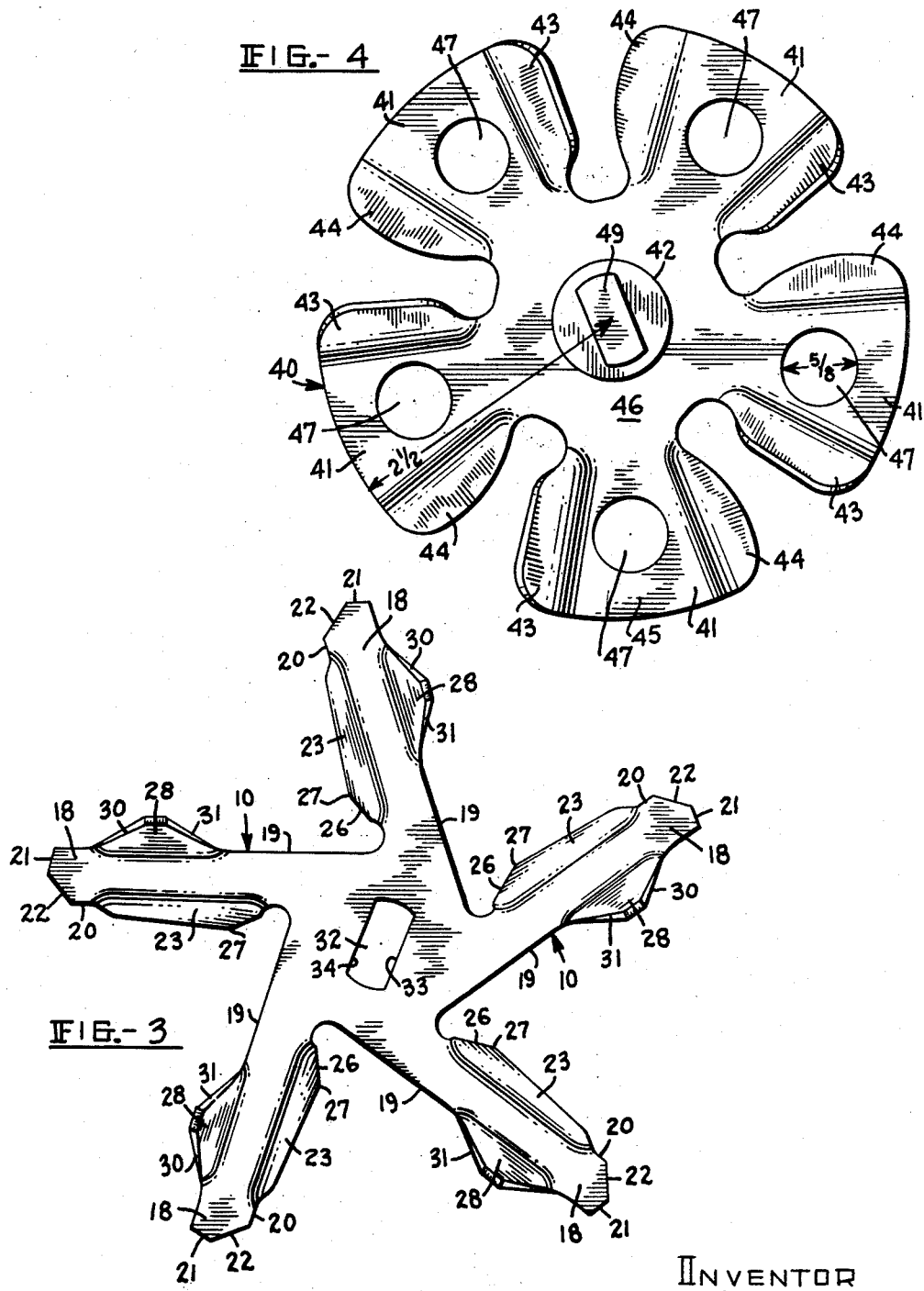

Sept. 8, 1964  H. A. STIFFLER  3,147,958
ICE CREAM-MILK MIXER
Filed Feb. 13, 1963  3 Sheets-Sheet 3
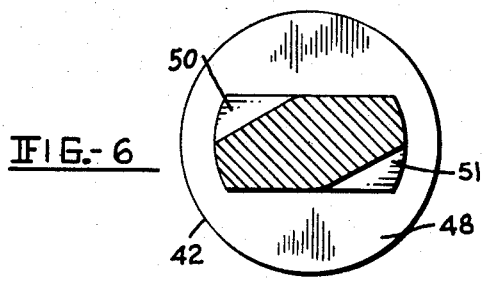
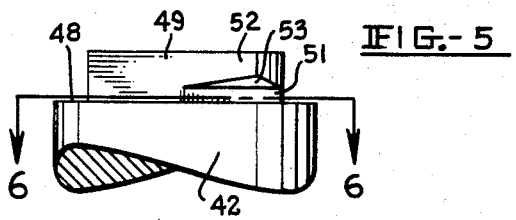
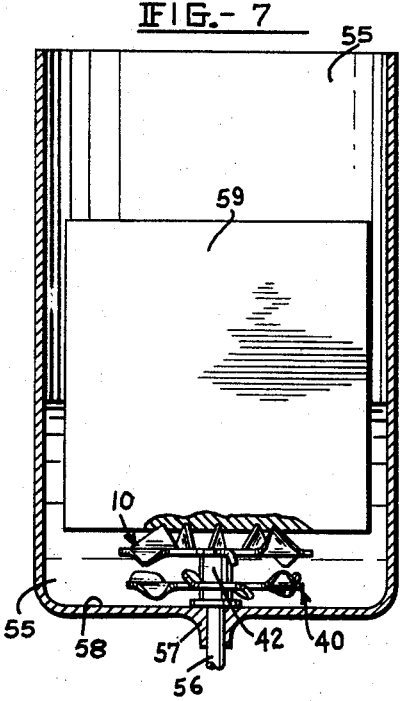
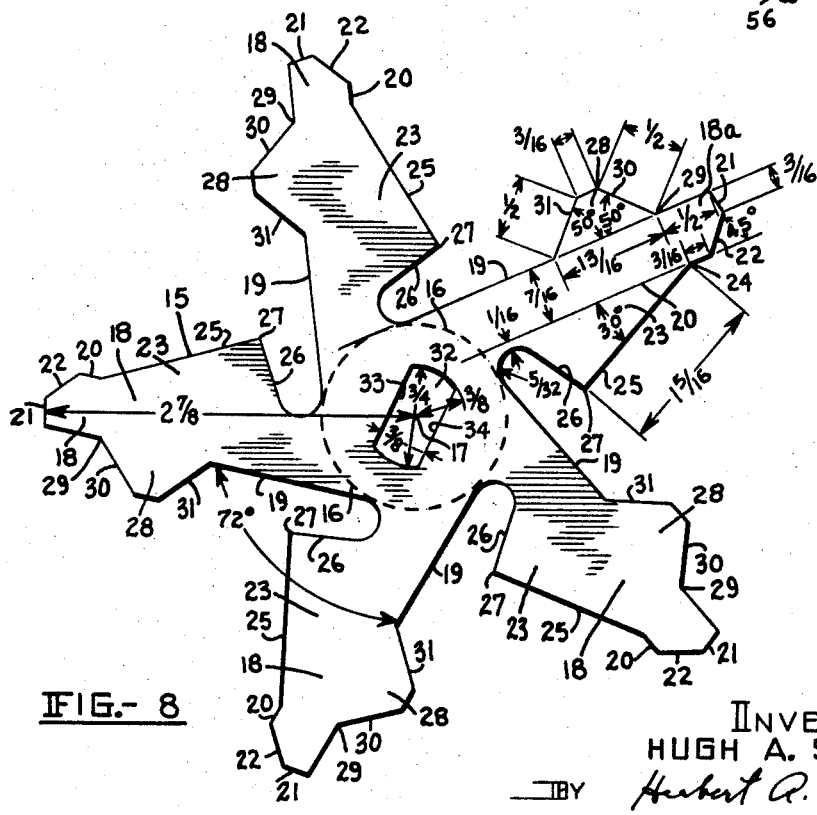
INVENTOR
HUGH A. STIFFLER
BY Herbert Q. Winturn
ATTORNEY //# 3,147,958
ICE CREAM-MILK MIXER
Hugh A. Stiffler, 956 N. Layman St., Indianapolis, Ind.
Filed Feb. 13, 1963, Ser. No. 258,272
1 Claim. (Cl. 259—134)

This invention relates to a mechanical device for intermixing and blending ice cream in milk, and incorporates a wheel which shaves or cuts off ice cream and in cooperation with a second wheel brings the resultant mixture of ice cream and milk into a smooth form such as would be employed in the so-called popular milk shakes.

The invention provides through the above indicated device a rapid operation saving much time in making the mix, and also permits the use of a smaller or less powerful electric motor to drive the cutting and mixing mechanism.

In addition to the above indicated objects and advantages, there is the advantage of quick attachment and detachment of one part from and to another part permitting thorough cleaning, and very importantly, providing smooth bends or corners in which the material being manipulated does not pile up or remain out of the resultant mixture.

The mechanism is extremely simple and readily manufactured at a comparatively low cost.

The foregoing indicated objects and advantages of the invention are primary ones, and others will become apparent to those versed in the art in the following description of one particular form as now best known to me and which is now in operation, as illustrated in accompanying drawings, in which FIG. 1 is a view in top plan of an assembly of two elements forming the invention, namely an upward dispersal knife and a lower dispersal wheel;

FIG. 2 is a view in side elevation of the assembly;

FIG. 3 is a view in bottom plan of the dispersal knife;

FIG. 4 is a view in top plan of the dispersal wheel;

FIG. 5 is a detail on an enlarged scale of an upper end of a post on which the dispersal wheel is detachably mounted;

FIG. 6 is a view in transverse section on the line 6—6 in FIG. 5;

FIG. 7 is a central vertical section through a vessel within which the wheel operates; and FIG. 8 is a plan view of a blank preliminary to being formed into the dispersal knife.

The dispersal knife generally designated by the numeral 10 is initially formed in blank as illustrated in FIG. 8 out of sheet steel of a thickness such, for example, as fourteen gauge.

In laying out the blank, a circle drawn as indicated by the dash lines 16 has a center of curvature 17. In the one form of the dispersal knife 15 now being used, the radius of this circle 16 is eleven-sixteenths inches. The knife 15 is to have five arms designated in each instance by the numeral 18. Edges 19 of the arms 18, which edges will be termed trailing edges are each tangential to the circle 16. There are five of these arms 18 equally spaced apart so that the angles between these edges 19 will be seventy-two degrees in each instance. Each arm 18 is approximately seven-sixteenths inches in width from the trailing edge 19 to the leading edge 20. A continuation of each leading edge 20 line would overlap the circle 16. These arms 18 have an outer rounded end 21, the radius of curvature of these ends being approximately two and seven-eighths inches from the center 17. The ends 21 are cut off on a line forty-five degrees from the leading edge 20 in each instance, this cut off portion being on the line 22 with a three-sixteenths inch line 21.

Each of these arms 18 are identical in shape and dimensions, and hence the dimensions of one arm designated as 18a will be further described, the description thereof being sufficient for the other four arms.

On the leading edge 20 of the arm 18a there is generally triangular portion 23 extending therefrom, the description still being made in reference to the blank shown in FIG. 8. To form this triangle 23, an apex 24 is located to be three sixteenths inches from the forty-five degree line 20 measured along the leading edge 20. The edge 25 of the triangle 23 is disposed at thirty degrees from the line 20 if continued in parallelism with the trailing edge 19. The length of this edge 25 is approximately one and five-sixteenths inches. Going in a clockwise direction to the next appearing arm 18, a radius of five thirty-seconds inches is inscribed to be tangential to the edge 19 of that next arm 18, and also spaced from the continued line 20 a distance of one-sixteenth of an inch, and is continued around, to have a line 26 tangential to the circle described by this five thirty-seconds radius extend outwardly from the point of tangency to the end of the line 25, forming a sharp point 27 thereby.

Extending from the edge 19 of the arm 18a is a truncated triangular portion 28. The base of the triangle 28 would coincide with the line 19 as drawn thereacross, and a side of the triangle 28 intersects the line 19 at a point 29 and extends therefrom at an angle of substantially fifty degrees as indicated in FIG. 8. The point 29 is substantially one-half inch along the line 19 from the outer end 21 of the arms 18a. Spaced along the line 19 (if continued across the base of the triangle) a distance of thirteen-sixteenths inches, the other leg 31 of the triangle 28 extends at an angle of fifty degrees from the line 19 toward the other side of the triangle designated by the numeral 30. These lines 30 and 31 extend for lengths of one-half inches each, and are united at their outer ends by a line substantially three-sixteenths inches long and parallel to the line 19.

An aperture designated by the numeral 32 is centered on the center 17 to have parallel sides 33 and 34 spaced substantially three-eighths of an inch apart. The outer ends of the aperture 32 are bounded by lines spaced one from the other approximately three-fourths of an inch, these lines being curved on a three-eighths inch radius.

The foregoing description of the dispersal wheel 10 leaves the blank in a flat or planar condition. Both triangles 23 and 28 are bent respectively along the lines 20 and 19 from the arms 18. The triangle 23 is bent in a direction which is upwardly from the arms 18 when the dispersal wheel 10 is in use, the triangle 23 being bent from the arms substantially on the leading edge 20. The plane of the triangle 23 is bent to an angle of eighty-two degrees substantially upwardly from the plane of the arm 18, or eight degrees from the vertical to that plane. The inclination of the triangle 23 is in the direction, that is clockwise, of the intended travel of the wheel 10. The triangle 28 is bent downwardly from the plane of the arm 18 along a bend line coinciding substantially with the trailing edge 19. This triangle 28 is bent to an angle of seventy-two degrees backwardly from the trailing edge 19, or eighteen degrees back of a plane extending vertically downwardly from the arm 18. The relationships of these two triangular portions are best indicated in FIGS. 1 and 2, also in the fully formed wheel as shown in FIG. 3 in bottom plan. Thus in clockwise travel of the wheel 10, the triangle 23 will be leaning forwardly in the direction of travel approximately eight degrees while the trailing triangle 28 will be inclined rearwardly substantially at eighteen degrees.

A dispersal wheel 40 has five arms 41 each identical one with the other and being quite similar to the wheel of my Patent No. 3,030,083, issued April 17, 1962. This wheel is mounted on a central post 42. Each arm 41 has a leading edge portion 43 turned upwardly from the general plane of the wheel 40, and has a trailing edge portion 44 turned downwardly. Each of these portions 43 and 44 are disposed at an angle of forty-five degrees to an intermediate plane designated by the numeral 45, this portion of each arm being coplanar with the central body planar portion 46. Each arm 41 has a central aperture 47 therethrough approximately five-eighths of an inch in diameter. The radius of curvature from the center of the wheel to the outer edges of the members 41 is approximately two and one-half inches.

The post 42 has an upper end 48 generally planar and at right angles from the axis of the post. A lug 49 is centered on the axis of the post 42. This lug 49 is shaped to receive the dispersal knife aperture 32 with a sliding fit down thereover to allow the knife to rest on the surface 48. The lug 49 is undercut at opposite corners to provide a diagonal groove therein designated by the numerals 50 and 51. That is, the cuts 50 and 51 are in effect diagonal slots each with an overhanging lip 52, FIG. 5. Preferably, although not necessarily so, the under face of the lip 52 is sloped upwardly and outwardly as indicated in FIG. 5 to provide the surface 53. The lug 49 will extend through the aperture 32 to permit rotation of the dispersal knife 10 to have the opposite sides 33 and 34 enter the slots 50 and 51 under the overhanging lips 52. That is, the knife 10, FIG. 1, may be rotated with the ends of the aperture riding on the ends of the lug and the edges 33 and 34 entering the slots 50 and 51 respectively to provide a driving engagement also preventing the lifting of the knife from the face 48 of the post 42. The lug 49 is located circumferentially of the post 42 a definite degree so that when the knife has been rotated as just indicated the knife will have been turned counterclockwise a slight distance and there held to locate the upwardly extending triangular portion 23 aproximately vertically of the centers of the holes 47 of the wheel therebelow. The post 42 will be turned in clockwise direction so that the dispersal wheel 10 will be maintained in its rotated position on the post in respect to the lug 49.

In use, the two wheels thus interconnected are located adjacent the floor 58 of the tank 55, FIG. 7, and a shaft 56 will extend revolubly through a bearing 57 on the floor 58 of the tank 55 and engage in the post 42 in any suitable driving manner, herein not shown since that driving connection may be varied. Also it is to be noted that the interconnection of the dispersal wheel and the dispersal knife is but one form of interconnection, as now best known to me, but obviously capable of assuming different structural forms.

The tank 55 is made to have the diameter sufficient to receive the normal molded ice cream which comes in gallon or more cylindrical packages with but slight circumferential clearance between the ice cream and the wall of the tank. With the wheels 10 and 40 located as above indicated within the tank 55, the ice cream may be lowered into the tank 55 in the measured amount as desired, and then the milk and other fluids as may be desired are poured in, or the fluids and the ice cream may be reversed in the order of placing them in the tank. In any event, the ice cream will be in such proportion to the fluid that it will rest on the dispersal knife 10 and the height of the fluid will not be sufficient to float it.

With the turning of the two wheels in unison, the upper dispersal knife 10 will start scraping off and cutting into the underside of the ice cream mass generally designated by the numeral 59 in the presence of the fluid. The ice cream will tend to remain stationary due to its mass and a high motor speed transmitted to the wheels. The under wheel 40 will tend to cause upper portions of the fluid as well as the removed ice cream to be carried downwardly and circulated around, and thence upwardly and finally downwardly in flow actions so that as the ice cream is removed by the wheel 10, that ice cream will be dispersed throughout the fluids, until the entire chunk of ice cream 59 has been in effect disintegrated and dispersed in the fluid. Since the wheel 40 has a tendency to pull currents of the fluid downwardly, air at the top of the fluid will tend to be drawn into the fluid so as to aerate that fluid and produce the normal consistency of a milk shake which is well filled with air throughout its volume. Of course the shape of the dispersal knife will not only shave off and remove particles of ice cream in the presence of the fluid tending in effect to melt the ice cream to some degree at least, but will also tend to agitate and stir up the fluids in the tank all to the desired end.

The shaping and proportioning of the dispersal knife 10 with the nonradial arms; the upwardly turned sharp pointed triangular portions; and the down turned lesser triangular portions with blunted ends has been found to be most effective in producing the results desired with a surprisingly low amount of input of power to accomplish the results.

Therefore while I have described my invention in the one particular form as now best known to me, it is obvious that structural changes may be made, and particularly changes may be made in the dimensions set forth for different diameters of tanks although the proportioning may remain the same, and I do not desire to be limited to that precise form beyond the limitations which may be imposed by the following claim.

I claim:

Means for mixing ice cream from a mass with a fluid in a vessel comprising an ice cream rotatable dispersal knife;

a rotatable dispersal wheel;

means drivingly, interconnecting said knife and said wheel in spaced apart vertical axial alignment;

said knife having a plurality of circumferentially spaced apart arms in a common plane and having leading and trailing edges;

a cutter blade extending upwardly from the leading edge of each arm; blade extending downwardly from the trailing edge of each of said arms;

said dispersal wheel having discrete arms each with a leading upturned and a trailing downturned blade circulating fluid in said vessel primarily downwardly therein;

said blades on said knife removing ice cream from the under side of said mass and directing the removed ice cream downwardly into the circulating fluid therebelow;

said knife arms each being approximately planar;

said knife leading blades being essentially triangular and each having an apex directed upwardly with base lines coinciding with the leading edges of said arms;

each of said knife leading blades being inclined in a leading direction slightly from the respective arms; and each of said knife trailing blades being truncated triangularly shaped, inclined slightly downwardly and rearwardly from the respective arms and terminating in a lower straight edge spaced above a wheel arm.

References Cited in the file of this patent

UNITED STATES PATENTS

| 599,661 | Scopes | Feb. 22, 1898 |
| 2,201,947 | Valentine | May 21, 1940 |
| 3,030,083 | Stiffler | Apr. 17, 1962 |

FOREIGN PATENTS

| 650,386 | Great Britain | Feb. 21, 1951 |
| 1,052,079 | Germany | Mar. 5, 1959 |